J. L. PERKINS.
BROACH TOOTH.
APPLICATION FILED JUNE 14, 1920.

1,396,523. Patented Nov. 8, 1921.

WITNESS:
C. C. West.

INVENTOR.
Julian L. Perkins,
BY
Frank A. Cutter,
ATTORNEY.

UNITED STATES PATENT OFFICE.

JULIAN L. PERKINS, OF WEST SPRINGFIELD, MASSACHUSETTS, ASSIGNOR TO PERKINS APPLIANCE COMPANY, OF SPRINGFIELD, MASSACHUSETTS, A CORPORATION OF MASSACHUSETTS.

BROACH-TOOTH.

1,396,523.  Specification of Letters Patent.  Patented Nov. 8, 1921.

Application filed June 14, 1920. Serial No. 388,986.

*To all whom it may concern:*

Be it known that I, JULIAN L. PERKINS, a citizen of the United States of America, and a resident of West Springfield, in the county of Hampden and State of Massachusetts, have invented a new and useful Broach-Tooth, of which the following is a specification.

My invention relates to improvements in tools or implements designed to cut grooves in the interior of hollow cylindrical objects, such as key-ways in the hubs of pulleys for example, or to cut exterior grooves as in the formation of gear teeth, and more particularly to the teeth of such tools or implements, and resides in an independent or separable tooth having formed therein a chip-clearance passage for the escape of the chips cut by said tooth, it being understood that the broach of which this tooth forms a part has a shank divided or otherwise constructed so that the tooth can be received and secured therein and released and removed therefrom.

In a broach of the type mentioned above it is imperative that ample provision be made for the escape of the chips cut by the broach teeth, and the primary object of my invention is to provide teeth, for a broach wherein the teeth are independent of and separable from the shank of said broach, with chip-clearance passages, so that said teeth may be located in abutting relationship in said shank, to the end that the structure of the broach as a whole is strengthened and made more rigid than would be the case if the teeth were located out of contact with each other in the shank and passages formed therein for the escape of the chips laterally.

Other objects and advantages will appear in the course of the following description.

This tooth enters into the construction of the broach which forms the subject of Patent No. 1,370,837, granted Mar. 8, 1921, to J. L. Perkins and F. W. Sickles, to which reference may be had in connection with the construction and operation of a broach equipped with a plurality of teeth of a type such as that which forms the subject of this application.

I attain the objects and secure the advantages of my invention by the means illustrated in the accompanying drawings, in which—

Figure 1:
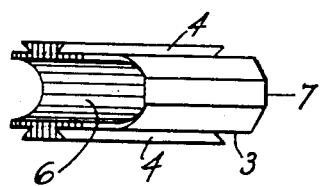
Figure 2:
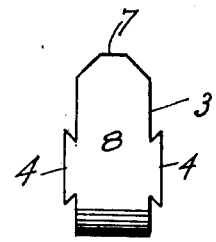
Figure 3:
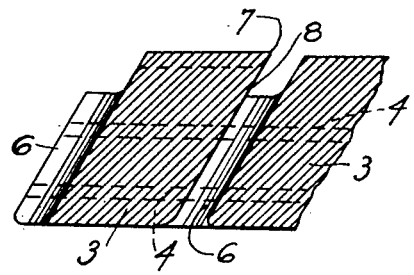
Figure 4:
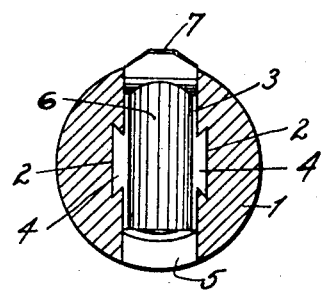
Figure 5:
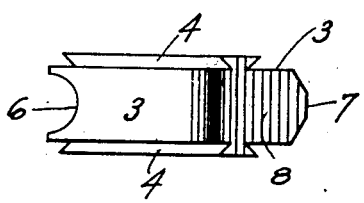
Figure 6:
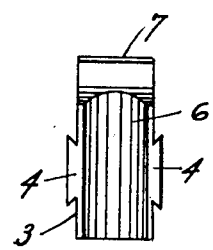

Figure 1 is a top plan of a broach tooth which embodies a practical form of my invention; Fig. 2, a right-hand or front end elevation of said tooth as it appears in the preceding view; Fig. 3, a central, longitudinal, vertical section through said tooth and through a portion of another similar tooth, the former being behind the latter; Fig. 4, a left-hand or rear end elevation of said first-named tooth, the same being shown incorporated with a shank adapted to receive it, and which shank is in cross section; Fig. 5, a bottom plan of the tooth, and, Fig. 6, a rear end elevation of a tooth which has a cutting edge somewhat different from that shown in the other views.

Similar reference characters designate similar parts through out the several views.

In Fig. 4 I show in cross section a broach comprising a shank 1 which is centrally divided to receive a plurality of teeth, and has longitudinal, dovetail grooves 2—2 in opposite sides of the slot in said shank. Each tooth which is receivable in the shank 2 comprises a body part 3 that is provided on the sides with dovetail lugs 4—4 to fit within the grooves 2. The teeth in the shank 1 are so arranged therein and so proportioned relative to said shank and to the slot in the shank for said teeth, that a longitudinal, chip-clearance passage 5 is left or provided within the shank below the teeth. A single tooth only is shown in this view, it not being considered necessary to illustrate the broach more in detail, since reference may be had to the patent hereinbefore mentioned. The lugs 4 form no part of the present invention, and neither do the cutting edges of the teeth, to which reference will subsequently be made.

Preferably both ends of each tooth or of the body part 3 thereof are inclined, from above, downwardly and rearwardly, as shown, and a groove 6 is formed in the rear end of said body part to constitute or provide a chip-clearance passage, such groove extending from the top to the bottom of said part. This is the important feature of the present invention.

The cutting edge of each body part 3, which edge is designated by the numeral 7, may be of any suitable form or shape, such as that shown in the first five views, or that shown in the last view, these being examples only. The cutting edge 7 in each case is at the junction of the top of the body part with the front end thereof. The cutting edge 7 necessarily projects beyond the shank 1.

The teeth are arranged in abutting relation in the shank as previously observed, with the longer, straight edges of the grooves 6 in the rear end of a leading tooth in contact with the front end of the tooth directly behind or immediately following, it being understood that such front end is always plane or flat, as indicated at 8. Thus, when two teeth are in proper contact, as illustrated in Fig. 3, a passage for the chips is formed by the grooved part at the back end of one tooth and the plane front end of another tooth, such passage opening only at the top, to receive the chips, and at the bottom, for the escape of the chips.

It will now be seen that the chips cut by the cutting edge 7 of a tooth pass down the front end of said tooth, through the groove or passage 6 in the tooth in front, and into the longitudinal passage 5 in the shank 1, to escape through the bottom or at the rear of said last-named passage.

Other advantages of providing the removable teeth of a broach with chip-clearance passages reside in the fact that such teeth lend themselves, by reason of such provision, more readily to broach construction of this type, and in the further fact that the construction of the shank may be very much simplified and cheapened.

The chip-clearance passages in the teeth take the place of the transverse chip-clearance passages heretofore provided in the shank.

The teeth will necessarily be modified more or less in shape and size to meet different conditions.

What I claim as my invention, and desire to secure by Letters Patent, is—

1. A tooth, for a broach, consisting of a body part having a cutting edge, and a chip-clearance passage.

2. A tooth, for a broach, consisting of a body part having a cutting edge, and a groove in one end to form a chip-clearance passage.

3. A tooth, for a broach, consisting of a body part having a cutting edge at the junction between the top and front end of such part, and a groove in the rear end of such part to form a chip-clearance passage.

4. A tooth, for a broach, consisting of a body part having a cutting edge, dove-tail supporting lugs on the sides extending between the front and back edges of said body part, and a chip-clearance passage in one end.

5. A tooth for a broach, consisting of an approximately rhomboidal-shaped body, one of the acute angles of which forms a cutting edge, which edge is at the front end of said body, and having a chip-clearance passage in the rear end.

JULIAN L. PERKINS.

Witnesses:
F. A. CUTTER,
WALTER A. PARRISH.